United States Patent [19]

Imamura et al.

[11] Patent Number: 4,833,598
[45] Date of Patent: May 23, 1989

[54] I/O INTERRUPT HANDLING MECHANISM IN A MULTIPROCESSOR SYSTEM

[75] Inventors: Jiro Imamura; Katsuro Wakai; Tohru Yoshida, all of Hadano, Japan

[73] Assignee: Hitachi, Ltd., Tokyo, Japan

[21] Appl. No.: 76,069

[22] Filed: Jul. 21, 1987

[30] Foreign Application Priority Data

Jul. 24, 1986 [JP] Japan .............................. 61-172860

[51] Int. Cl.[4] .............................................. G06F 13/24
[52] U.S. Cl. .................... 364/200; 364/230.2; 364/241.3
[58] Field of Search ... 364/200 MS File, 900 MS File

[56] References Cited

U.S. PATENT DOCUMENTS 4,271,468 6/1981 Christensen et al. .............. 364/200
4,644,465 2/1987 Imamura .............................. 364/200

Primary Examiner—Thomas M. Heckler
Attorney, Agent, or Firm—Antonelli, Terry & Wands

[57] ABSTRACT

In a multiprocessor system in which a plurality of instruction processors (IP's) share a main storage (MS) and a channel controller (CHC) through a system controller (SC), when an I/O interrupt request is issued, IP's connected to the SC are examined to determine whether each of the IP's is executing an instruction which permits acceptance of the I/O interrupt request during the execution of the instruction. If one of the IP's is not executing such an instruction and can accept the I/O interrupt request, that IP will be selected.

6 Claims, 3 Drawing Sheets

FIG. I   PRIOR ART

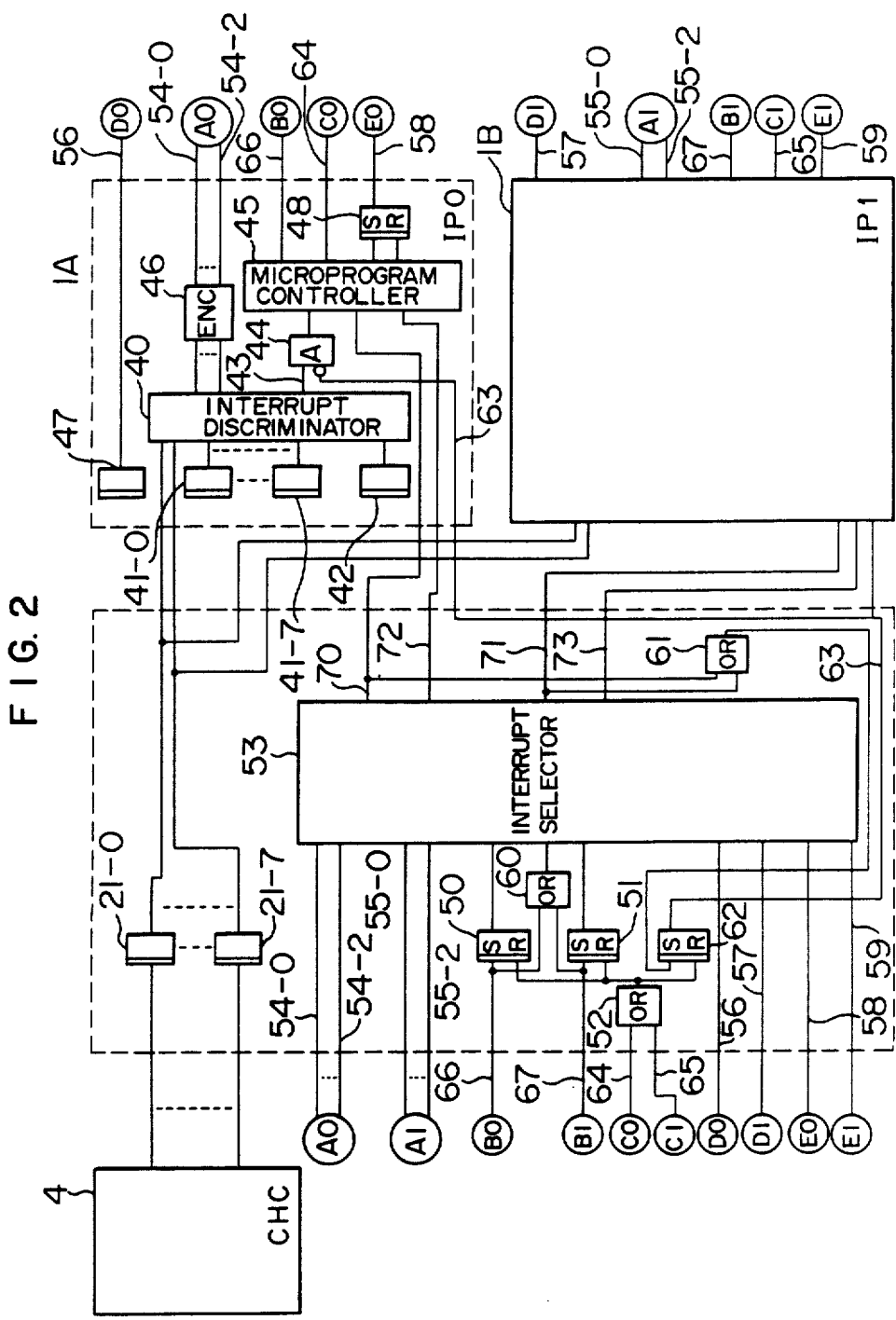
F I G. 2

I/O INTERRUPT HANDLING MECHANISM IN A MULTIPROCESSOR SYSTEM

CROSS-REFERENCE TO RELATED APPLICATIONS

This application is related to U.S. Patent Application Ser. No. 623,086 entitled "Apparatus for Controlling I/O Interrupt in a Multiprocessor System", filed June 21, 1984 by Jiro Imamura and assigned to the present assignee, now U.S. Pat. No. 4,644,465 issued Feb. 17, 1987.

BACKGROUND OF THE INVENTION

The present invention relates to a multiprocessor system having a plurality of instruction processors, and more particularly to a multiprocessor system which receives multi-level I/O interrupts from a common I/O device to select those of a plurality of instruction processors which process respective I/O interrupts.

When an I/O interrupt is to be processed in a multiprocessor system having a plurality of instruction processors, an I/O interrupt can be selected from not only the instruction processor which has energized the channel through which the I/O interrupt has been issued, but also from any instruction processor out of the plurality of instruction processors. An example thereof is disclosed in U.S. Pat. No. 4,271,468. In such a system, the I/O interrupt is processed in the following manner. An I/O interrupt request from a channel controller is temporarily held in a system controller, which then inquires to each instruction processor whether or not it can accept the interrupt request. The instruction processors each indicate whether they can accept the interrupt request to the system controller, which, after receipt of replies from all instruction processors, selects an optimum instruction processor and causes it to process the interrupt. This will be explained in more detail with reference to a system configuration shown in FIG. 1.

FIG. 1 shows a configuration of a multiprocessor system. Numerals 1A and 1B denote instruction processors (hereinafter referred to as IP0 and IP1), numeral 2 denotes a system controller (SC), numeral 3 denotes a main storage (MS), numeral 4 denotes a channel controller (CHC), numeral 5 denotes an I/O controller (IOC), numeral 6 denotes an I/O device (I/O), numeral 21 denotes an interrupt pending register, and numeral 31 denotes an interrupt queue for one of a plurality of levels $\theta_0-\theta_7$.

In the multiprocessor system shown in FIG. 1, IP0 and IP1 share MS 3 and CHC 4 through SC 2, one IOC 5 is connected to each channel (CH) of CHC 4, and a plurality of I/O's are connected to each IOC 5. The interrupt queue 31 is provided in MS 3 to store pending I/O interrupt requests as queues $\theta_0-\theta_7$ for respective levels. The interrupt pending register 21 which indicates whether the queues for the respective levels in MS 3 are empty or not is provided in the SC 2. Bits 0-7 of the register 21 indicate empty or not empty states of the queues $\theta_0-\theta_7$.

When an I/O interrupt request is issued from CH 4 to SC 2, SC 2 registers the interrupt request in the interrupt queue $\theta_i$ of the corresponding level in MS 3. If the interrupt queue $\theta_i$ is empty and it is to register the interrupt request for the first time, a corresponding bit of the interrupt pending register 21 in SC 2 is set to "1". If one or more interrupt requests have been registered in the queue $\theta_i$, the corresponding bit of the interrupt pending register 21 has been set to "1" and no further change is made. SC 2 sends the content of the interrupt pending register 21 simultaneously to IP0 and IP1. If IP0 and IP1 are in a state to be able to accept the interrupt, they send accept signals and highest order non-masked queue identifier signals to SC 2. If IP0 or IP1 is in a wait state, it also sends a WAIT signal to SC 2. SC 2 responds to the response signals from IP0 and IP1 as follows.

(1) If only one IP sends back accept signal and the other IP does not send it back, SC 2 causes the former IP to handle the interrupt request.

(2) If two IP's send back accept signals and the levels of the interrupt queues are not equal, SC 2 causes both IP's to handle interrupt request.

(3) If two IP's send back accept signals and the levels of the interrupt queues are equal; and (A) if none of the two IP's is in the wait state or if both IP's are in the wait state, SC 2 selects one of the IP's in a predetermined priority order and causes the selected IP to handle the interrupt request, or (B) if only one IP is in the wait state, SC 2 causes the IP which is in the wait state to handle the interrupt request.

In U.S. Pat. No. 4,644,465, an interrupt controller in the SC holds I/O interrupt control data of the respective IP's, and selects an appropriate IP without corresponding with the IP's to cause the selected IP to handle the I/O interrupt request.

In the prior art I/O interrupt handling system, if an IP in the wait state is present, that IP is selected for handling the interrupt request in order to enhance system performance.

However, in the prior art system, even if the IP is not in the wait state, it sends back the accept signal to the SC in one of the following cases, and if it is selected by the SC, it handles the interrupt request.

(1) An I/O interrupt request is issued at a break of instructions and there is no higher priority interrupt factor than the I/O interrupt.

(2) An I/O interrupt request is issued during execution of instructions, such as an integrated array processor (IAP) instruction or a longer (MVCL) instruction, there is no higher priority interrupt factor than the I/O interrupt and an instruction which permits acceptance of the interrupt is being executed.

The MVCL instruction provides for transfer of a specified length of data from a second address of the MS to a first address. The IAP instruction calls for a vector operation not in an independent array processor, but in an IP. There may be first, second and third operands. In such a case, an operation result involving the second and third operands is stored in a location specified by the first operand. The operation is iterated as many times as the number of elements specified by the instruction.

Since the execution time for the IAP instruction or MVCL instruction may be long, the IP permits acceptance of an interrupt request during the execution of such instruction. After the interrupt request has been handled, the execution of the instruction is resumed. Since such instruction is executed with prefetching of operands in the IP, the prefetched operands are invalidated and save and restore operations of registers are required if the interrupt request is accepted in the course of execution of the instruction and the interrupting program is executed. As a result, the overall system performance is lowered.

SUMMARY OF THE INVENTION

It is an object of the present invention to provide a multiprocessor system which selects an optimum IP to enhance system performance.

In accordance with one feature of the present invention, each IP is provided with indication means to indicate whether or not it is executing an instruction which permits acceptance of an I/O interrupt request in the course of execution of the instruction. Selection means, which selects one of IP's to handle the I/O interrupt request, responds to the indication means to select an IP which is not executing an instruction which permits the acceptance of the I/O interrupt request.

BRIEF DESCRIPTION OF THE DRAWINGS

FIG. 2 shows a block diagram of one embodiment of the present invention, and

DESCRIPTION OF THE PREFERRED EMBODIMENTS

Figure 1:
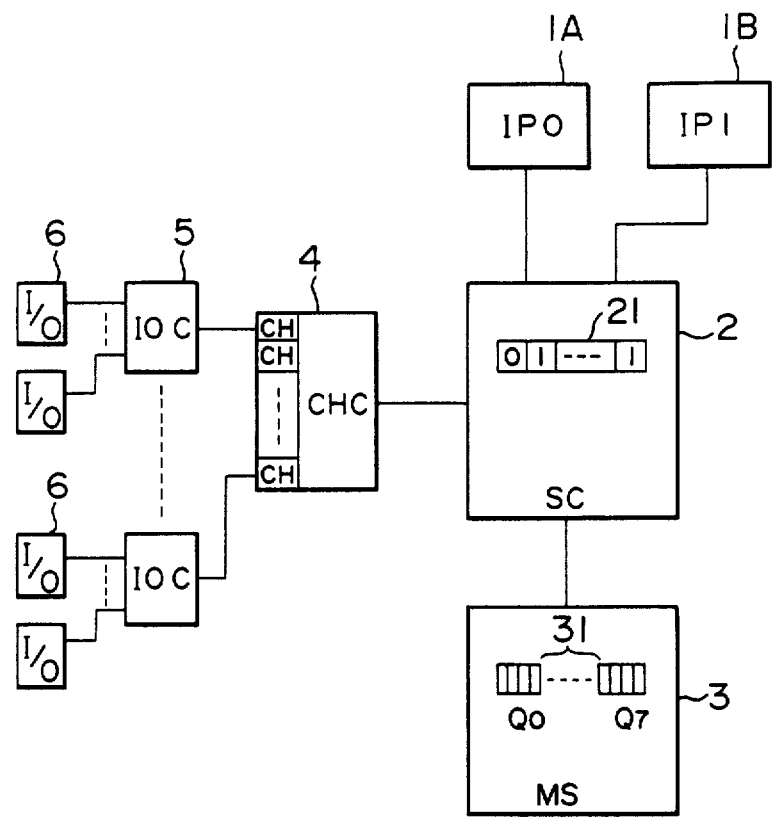
FIG. 1 shows a block diagram of a configuration of a multiprocessor system.

FIG. 2 shows a block diagram of one embodiment of the present invention, and it particularly shows interconnection of an instruction processor (IP), a system controller (SC) and a channel controller (CHC), and pertinent portions an IP and SC. In FIG. 2, numerals 1A, 1B, 2 and 4 denote the same elements as those shown in FIG. 1, numerals 21-0 to 21-7 denote latches which constitute an interrupt pending register 21, numeral 40 denotes an interrupt discriminator, numeral 45 denotes a microprogram controller, and numeral 53 denotes an interrupt selector. In the present embodiment shown in FIG. 2, only IP0, IP1, SC 2 and CHC 4 are shown, although the overall configuration of the multiprocessor system to which the present invention is applied is similar to the system configuration shown in FIG. 1. Portions of IP1 which are pertinent to the present invention are identical to those of IP0 and hence they are omitted in FIG. 2. Signal lines A0–E0 and A1–E1 extending from IP0 and IP1 are connected to the interrupt selectors 53 in SC 2 through identically designated signal lines.

SC 2 comprises the latches 21-0 to 21-7 which constitute the interrupt pending register 21 shown in FIG. 1, and the interrupt selector 53 which receives information indicating the status of IP0 and IP1 to select an optimum IP. IP0 and IP1 each comprises an interrupt discriminator 40 which receives the signals from the latches 21-0 to 21-7 in SC 2 and an interrupt mask signal of its IP to determine acceptability of the interrupt request and produce an interrupt queue signal, and a microprogram controller 45 which receives the signal from the interrupt selector 53 in SC 2 and the signal from the interrupt discriminator 40 to produce a signal indicating a state of its IP at the time of interrupt request.

When an I/O request is issued from CHC 4, it is registered in the interrupt queue $\theta_i$ of the corresponding level in MS 3 as explained with reference to FIG. 1. If the interrupt queue $\theta_i$ is empty and it is the first registration, a latch 21-i which holds the corresponding bit of the interrupt pending register 21 in SC 2 is set to "1". If one or more interrupt request has already been registered in the interrupt queue $\theta_i$, the corresponding bit of the register 21 in SC 2 has already been set to "1" and the register 21 is not changed this time. The outputs of the latches 21-0 to 21-7 which constitute the interrupt pending register 21 are transferred to IP0 and IP1.

The interrupt discriminator 40 in each of IP0 and IP1 receives an output of an I/O interrupt mask latch 42 which is a portion of an interrupt mask corresponding to the interrupt queues set in the control registers 41-0 to 41-7 and a program status work (PSW), and the outputs of the latches 21-0 to 21-7 which constitute the interrupt pending register 21, and if it can accept the interrupt request, it sets a level of an output signal 43 to "1". Namely, the interrupt discriminator 40 sets the output signal 43 to "1" if the I/O interrupt mask latch 42 is "1", the interrupt pending register latches 21-0 to 21-7 include at least one "1" and the interrupt mask corresponding to the interrupt queue of the corresponding one of registers 41-0 to 41-7 is "1". If the output signal 43 of the interrupt discriminator 40 is "1" and an interrupt suppress signal 63 to be explained later is "0", an output of an AND gate 44 is "1", which is supplied to the microprogram controller 45.

When a condition to permit acceptance of the I/O interrupt request is met, the microprogram controller 45 breaks into an I/O interrupt routine. The I/O interrupt request is accepted when:

(1) The IP is in the wait state, (2) The I/O interrupt request is issued in a break between instructions and there is no higher priority interrupt factor than the I/O interrupt, or (3) An IAP or MVCL instruction is being executed and there is no higher priority interrupt factor than the I/O interrupt and the I/O interrupt request can be accepted.

After the microprogram controller 45 in IP0 or IP1 has broken into the I/O interrupt routine, it sends an accept signal 66 or 67 in a form of pulse signal to SC 2. A priority encoder 46 in IP0 or IP1 selects a high priority queue of the acceptable interrupt queues in the interrupt queues and sends 3-bit signals 54-0 to 54-2 or 55-0 to 55-2 identifying the selected queue to SC 2. Moreover a wait latch 47 which is a portion of the PSW sends a wait signal 56 or 57 to SC 2. A latch 48 in IP0 or IP1 indicates that the IP is executing an instruction which permit I/O interrupt, and the output signal 58 or 59 thereof is also sent to SC 2. The latch 48 is set by a microprogram at the start of execution by the IP of an instruction such as an IAP instruction or MVCL instruction which permits acceptance of interrupt request in the course of execution of the instruction, and is reset by the microprogram at the end of the execution.

On the other hand in SC 2, a latch 50 is set by the accept signal 66 from IP0 and a latch 51 is set by the accept signal 67 from IP1. The latches 50 and 51 serve to record which one of IP0 and IP1 has issued the accept signal. They are reset through an OR gate 52 when the interrupt routine is completed in IP0 and/or IP1 and end signals 64 and/or 65 are sent to SC 2.

Applied to the interrupt selector 53 are the output signals of the latches 50 and 51, the signals 54-0 to 54-2 and 55-0 to 55-2 indicating the interrupt queue numbers, the wait signals 56 and 57, signals 58 and 59 indicating that instruction is being executed and the accept signals 66 and 67 through an OR gate 60. The interrupt selector 53 is triggered by the output signal of the OR gate 60 to select the IP which handles the interrupt request and issues select signals 70 and 71 or reject signal 72 and 73 in the form of pulse signal to IP0 and IP1. The select signal or reject signal is supplied to a latch 62 through an OR gate to set the latch 62 and generate an interrupt suppress signal 63, which is "1" during handling of the interrupt request and reset through the OR gate 62 when interrupt end signals 64 and 65 are issued from IP0 and/or IP1. The interrupt suppress signal 63 is sent to IP0 and IP1 to inhibit an AND gate 44 while the signal 63 is "1" to prevent the microprogram controller 45 from breaking into the interrupt routine.

The interrupt selector 53 selects the IP which handles the interrupt request in the following manner.

(1) If IP0 and IP1 issue accept signals and the signal indicating that an IP is executing an instruction is "1" for one IP and "0" for the other IP, the interrupt selector selects the latter IP.

(2) In other cases, an optimum IP is selected to enhance the system performance as follows.

① If only one IP issues an accept signal and the other IP does not issue an accept signal, the IP which issues an accept signal is selected.

② If two IP's issue accept signals and the interrupt queue numbers of the two IP's are not equal, the two IP's are selected.

③ If two IP's issue accept signals and the interrupt queue numbers of the two IP's are equal, one of the IP's is selected in the following manner.

(A) If none of the two IP's is in the wait state or the two IP's are in the wait state, a predetermined one of the IP's is selected.

(B) If only one of the IP's is in the wait state, that IP is selected.

The interrupt selector 53 selects the IP which handle the interrupt request, in the manner described above. If the IP which has issued the accept signal receives the select signal, that IP fetches the interrupt request registered in the interrupt queue in the MS 3 to handle the interrupt request. If the IP receives the reject signal, it does nothing.

Figure 3:
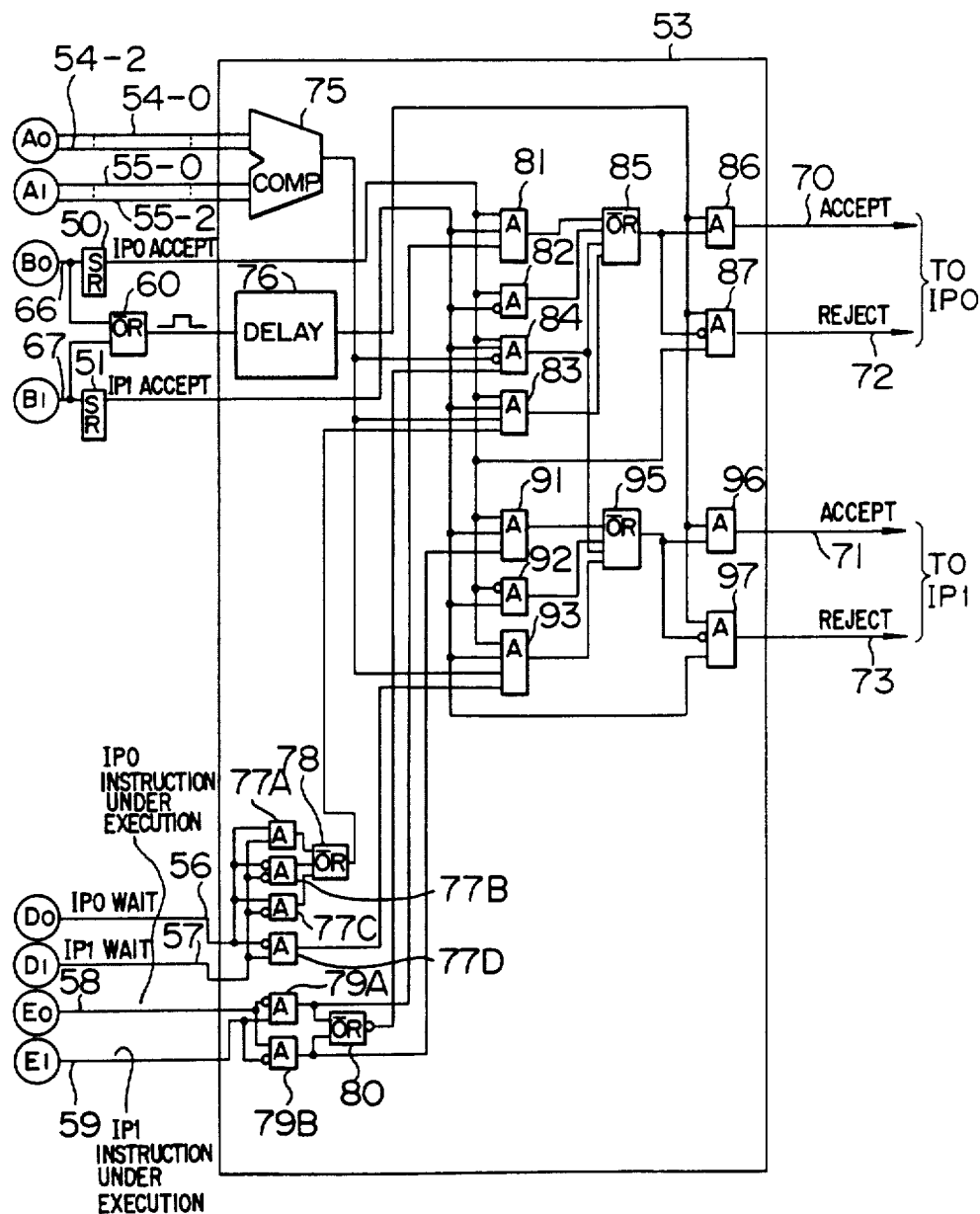
FIG. 3 shows a block diagram of an interrupt selector of FIG. 2.

FIG. 3 shows a specific circuit of the interrupt selector 53. A comparator 75 compares 3-bit queue numbers supplied from IP0 and IP1, and when they are equal, produces a match signal "1". AND gates 77A-77D receive the wait signal 56 from IP0 and the wait signal 57 from the IP1. The AND gate 77A opens when both IP0 and IP1 are in the wait state, and the AND gate 77B opens when none of IP0 and IP1 is in the wait state. The AND gate 77C opens when IP0 is in the wait state and IP1 is not in the wait state. The AND gate 77D opens when IP0 is not in the wait state and IP1 is in the wait state. The outputs of the AND gates 77A-77C are supplied to an OR gate 78.

AND gates 79A and 79B receive the signals 58 and 59 from IP0 and IP1. The signals 58 and 59 indicate whether or not IP0 and IP1 are executing instructions which permit acceptance of I/O interrupt request during the execution of an instruction, such as IAP instruction or MVCL instruction. The AND gate 79A opens when IPO is not executing the instruction and IP1 is executing the instruction, and the AND gate 79B opens when IPO is executing the instruction and IP1 is not executing the instruction. A NOR gate 80 produces a signal "1" when IP0 and IP1 are of the same condition, that is, when both IP0 and IP1 are executing the instruction or none of IP0 and IP1 is executing the instruction.

The AND gates 81-84 select the I/O interrupt to IP0 and the AND gates 84 and 91-93 select the I/O interrupt to IP1. The outputs of the AND gate 81-84 are supplied to an OR gate 85, an output of which is supplied to AND gate 86 and 87. The output of the AND gate 86 is the I/O interrupt accept signal 70 to the IP0 and the output of the AND gate 87 is the I/O interrupt reject signal 72 to the IP0.

On the other hand, the outputs of the AND gates 84 and 91-93 are supplied to an OR gate 95, an output of which is supplied to AND gates 96 and 97. The output of the AND gate 96 is the I/O interrupt accept signal 71 to the IP1 and the output of the AND gate 97 is the I/O interrupt reject signal 73 to IP1.

When both IP0 and IP1 issue the accept signals 66 and 67, the selector 53 selects by the AND gate 81 or 91 the IP which is not executing the interruption. That is, the AND gate 81 opens by the output of the AND gate 79A and the AND gate 91 opens by the output of the AND gate 79B. If only one of IP's issues the accept signal, the selector 53 selects by the AND gate 82 or 92 the IP which has issued the accept signal. If both IP's issue the accept signals and the comparator 75 issues the match signal, the AND gate 83 select IP0 by the output of the OR gate 78 and the AND gate 93 selects IP1 by the output of the OR gate 77D. In the present embodiment, the OR gates 77A, 77B and 77C are connected to the OR gate 78 so that IP0 is selected when IP0 and IP1 are of the same condition, that is, both are in the wait state or neither is in the wait state. The AND gate 84 is connected to the OR gates 85 and 95 so that both IP's are selected when the comparator 75 does not issue the match signal.

In the present embodiment, the output of the interrupt pending register 21 is sent from SC to IP0 and IP1, and thus the highest priority queue numbers, accept signals and wait signals are sent from IP0 and IP1 to SC. Alternatively, as shown in U.S. Pat. No. 4,644,465, SC may independently select IP without communication between SC and IP. In such a case, the wait latch 47 and the mask 41 are arranged in SC. The instruction execution signals 58 and 59 are supplied from IP's to SC as in the above embodiment.

In accordance with the present invention, if, among IP's which are connected to the SC, one is executing an instruction, such as IAP instruction or MVCL instruction, which permits acceptance of the I/O interrupt request during the execution of the instruction, and the other is not executing such instruction and accepts the I/O interrupt request, the SC selects not the former IP but the latter IP and causes the latter IP to handle the I/O interrupt request. In a case other than the former, SC selects an appropriate IP and causes it to handle the I/O interrupt request. As a result, a probability that the IP which is executing an instruction which permits the acceptance of the I/O interrupt request is selected as the IP to handle the I/O interrupt request becomes very small and the efficiency and performance of the overall multiprocessor system to which the present invention is applied can be enhanced.

We claim:

1. In a multiprocessor system comprising a plurality of instruction processors, a system controller to which said instruction processors are connected, a channel controller connected to said system controller, and an I/O interrupt handling mechanism for controlling the processing of an I/O interrupt request from said channel controller by said instruction processors, said mechanism comprising:

A plurality of indication means each connected to a respective one of said instruction processors for issuing an instruction execution signal indicating whether or not the corresponding instruction processor is executing an instruction which permits acceptance of an I/O interrupt request in the course of execution of that instruction; and selection means responsive to an I/O interrupt request and instruction execution signals from said indication means for selecting one of said instruction processors to handle the interrupt request and to issue an interrupt request handle signal to the selected instruction processor, said selection means including means responsive to the instruction execution signals of said indication means for preferentially selecting an instruction processor which is not executing an instruction which permits acceptance of the I/O interrupt request when not all instruction processors are executing such an instruction.

2. A multiprocessor system comprising:

a plurality of instruction processors for executing instructions, each instruction processor including means for issuing an accept signal under conditions where the corresponding instruction processor is able to accept an I/O interrupt request and means for issuing an instruction execution signal indicating whether or not the corresponding instruction processor is executing an instruction which permits acceptance of an I/O interrupt request signal in the course of execution of the instruction;

channel controller means for generating a signal representing an I/O interrupt request;

system controller means to which said instruction processors are connected for sending an I/O interrupt request signal to said instruction processors in response to said signal from said channel controller means and for performing data communication between at least a selected one of said instruction processors and said channel controller means, including interrupt selector means responsive to an accept signal and an instruction execution signal from said instruction processors for selecting an instruction processor to process said I/O interrupt request signal in such a manner that, if an accept signal and an instruction execution signal are received from one instruction processor, and an accept signal is received from another instruction processor while no instruction execution signal is received from that other processor, the interrupt selector means selects the other instruction processor.

3. A multiprocessor system according to claim 2, wherein said channel controller means includes means for generating signals representing different levels of interrupt; and said system controller means includes means for separately storing signals received from said channel controller means which represent different levels of interrupt and for applying each of said separately stored signals to each of said instruction processors.

4. A multiprocessor system according to claim 3, including first and second instruction processors each having means for producing a level signal indicating the level of interrupt of an I/O interrupt request for which that instruction processor has issued an accept signal; and wherein said interrupt selector means in said system controller means includes first means responsive to level signals received from said first and second instruction processors for producing a comparison output when the received level signals indicate the same level of interrupt, second means responsive to said instruction execution signal issuing means in said first and second instruction processors for producing an output signal when both of said first and second instruction processors do or do not issue an instruction execution signal, and third means responsive to (a) receipt of an accept signal from both said first and second instruction processors, (b) an output signal from said second means, and (c) no comparison signal from said first means, for applying a select output signal to both of said first and second instruction processors.

5. A multiprocessor system according to claim 4, wherein said interrupt selector means further includes fourth means responsive to receipt of an accept signal from both of said first and second instruction processors and an instruction execution signal from only said first instruction processor for applying a select output signal to said second instruction processor to select said second instruction processor to process a received I/O interrupt request signal.

6. A multiprocessor system according to claim 2, including first and second instruction processors, and wherein said interrupt selector means includes first means responsive to receipt of an accept signal from both of said first and second instruction processors and an instruction execution signal from only said first instruction processor for applying a select output signal to said second instruction processor to select said second instruction processor to process a received I/O interrupt request signal.

* * * * *